United States Patent [19]

Suzuki

[11] Patent Number: 5,383,035
[45] Date of Patent: Jan. 17, 1995

[54] PHOTOGRAPHIC FILM ANALYZER WITH SIMULATOR AND FILM INSPECTING METHOD

[75] Inventor: Kenji Suzuki, Kanagawa, Japan

[73] Assignee: Fuji Photo Film Co., Ltd., Kanagawa, Japan

[21] Appl. No.: 93,697

[22] Filed: Jul. 20, 1993

[30] Foreign Application Priority Data

Jul. 20, 1992 [JP] Japan .................. 4-192284

[51] Int. Cl.⁶ .................................. H04N 1/46
[52] U.S. Cl. .................... 358/500; 358/506; 358/487; 358/453; 355/40
[58] Field of Search ............... 358/500, 501, 506, 517, 358/527, 487, 474, 453; 355/40, 41

[56] References Cited

U.S. PATENT DOCUMENTS

| | | | |
|---|---|---|---|
| 3,807,861 | 4/1974 | Nosco et al. ............ | 355/40 |
| 4,701,046 | 10/1987 | Shiga ..................... | 355/40 |
| 4,727,399 | 2/1988 | Matsumoto ............ | 355/41 |
| 4,967,266 | 10/1990 | Yamamoto ............. | 358/527 |
| 5,019,858 | 5/1991 | Suzuki .................. | 358/527 |
| 5,162,842 | 11/1992 | Shiota .................... | 355/40 |
| 5,287,141 | 2/1994 | Yoshikawa ............. | 355/40 |

FOREIGN PATENT DOCUMENTS 3538822 10/1985 Germany .
4234027 8/1992 Japan .

OTHER PUBLICATIONS

English Language abstract for Japanese Patent Laid-Open Publication No. 4-234027.

*Primary Examiner*—Edward L. Coles, Sr.
*Assistant Examiner*—Thomas D. Lee
*Attorney, Agent, or Firm*—Sughrue, Mion, Zinn, Macpeak & Seas

[57] ABSTRACT

Developed photographic film has frames of a 35 mm full size and of a panoramic size recorded thereon. A panoramic frame is detected in a photographic printer. A masking is set on the panoramic frame as detected so as to mask the frame. Photometry and pick-up of the panoramic frame is performed while the panoramic frame stands masked by the masking. Photometry of the panoramic frame as masked is performed. On the basis of the photometric value, exposure information is calculated. A finished image is simulated and displayed on a monitor CRT as picked up, in simulation according to the exposure information. The panoramic frame is inspected through the simulated finished image. The masking is retracted from the panoramic frame. The monitor CRT displays a simulated finished image while the masking stands retracted. For a frame of a widevision size an a frame designated for pseudo-zooming printing, similar operation is performed for simulation.

29 Claims, 10 Drawing Sheets

PHOTOGRAPHIC FILM ANALYZER WITH SIMULATOR AND FILM INSPECTING METHOD

BACKGROUND OF THE INVENTION

1. Field of the Invention

The present invention relates to a photographic film analyzer and a film inspecting method, in which an image simulating an area to be printed is displayed on a display. More particularly, the present invention relates to a photographic film analyzer and a film inspecting method, in which automatic detection of areas to be printed can be visually confirmed.

2. Description of the Related Art

U.S. Pat. No. 4,967,266 discloses a photographic printer having a monitor display. A picture frame formed on developed film is set in a printing station. The printer incorporates a pick-up device for receiving an image on the frame and generating a corresponding image signal. To check the position of the frame in the printer and the density and color expected on a finished image of the frame, a subject image of the frame as received by the pick-up device is processed and displayed on a monitor display for the purpose of visual simulation.

Recently, panoramic photographs have become popular. A panoramic photograph is produced by recording a panoramic picture frame on a 35 mm photographic film in the format of 13×36 mm, and printing the panoramic frame on photographic paper e.g., at the format of 89×254 mm. Such a panoramic photograph is twice as long horizontally as a standard photograph, namely a full size photograph having an L-size or E-size.

To take a photographic subject to create the panoramic frame, a compact camera or a lens fitted film unit specially designed for panoramic photography is used. In addition, a variable frame size camera is now commercially available. The variable frame size camera is provided with a manually operable member arranged inside the camera for changing the frame size. Once the camera is loaded with film, the selected size cannot be changed until the end of the use of the single strip of film. Recently, another variable camera, which is provided with a manually operable adjusting member arranged outside the camera has become available. In the course of the use of the film, the frame size, either the full size or the panoramic size, can be selected as desired before each photograph is taken. This camera produces a single strip of exposed film which may have full size frames and panoramic frames.

A camera capable of pseudo-zooming photography is disclosed, for example, in Japanese Patent Laid-open Publication No. 4-234027. For pseudo-zooming photography, a camera is operated to expose a standard full size frame on photographic film. A desired portion inside the frame is designated for reproduction while a photographer observes a photographic subject, e.g., by displaying indicating marks in a viewfinder of a camera. For example, a rectangle can be displayed to indicate the desired portion of the image. Also, a zoom finder, with which the photographer targets the subject while the viewfinder zooms can be utilized. The camera checks the zooming magnification in correspondence with the targeted range, and records printing magnification data, derived from the zooming magnification, onto a recording medium, such as a magnetic recording area on the photographic film or an IC card in the camera. To print a trimming-printed photograph in a pseudo-zooming process, the designated portion in the frame to be printed is enlarged in accordance with the printing magnification data read out of the recording medium. The trimming-printed photograph as obtained has an image reproduced as if a photograph were taken with telephotography by zooming a zoom lens of a camera.

After use of a variable frame size camera, a single strip of exposed film is provided with full size frames and panoramic frames, and thus requires discrimination of the two sizes, by means of either automatic discrimination or visual recognition of the frames, for the purpose of selection of a printing mode. However, there are cases in which even an automatic discrimination process misjudges a panoramic frame as a full size frame. Firstly, a variable frame size camera is provided with masking members inserted in front of the film into the light path in the camera to mask upper and lower horizontal portions to form a panoramic aperture. One or more portions of the masking members could fail to shield light completely, so that subject image of the panoramic frame may have undesired exposed portions which are outside of the panoramic format. Secondly, a variable frame size camera, provided with an automatic date recording mechanism, could record a date of the photography on the lower marginal horizontal area which is outside the panoramic frame. The image of the date or the undesired exposed portions could be misjudged as part of a full size frame, because a sensor used for the automatic discrimination process of the frame sizes receives a signal of high density from these portions.

Further, there are image frames of which either automatic discrimination or visual recognition of the frame sizes is likely to misjudge a panoramic frame and a full size frame. For example, a frame in which the background scene is recorded at excessive underexposure while a principal subject is somewhat small, such as a scene of fireworks, may be very difficult to reliably discriminate.

The density and color of a finished image subjected to a pseudo-zooming operation can be checked and adjusted while simulating the finished image. With the simulated image observed, adjustment of exposure is visually estimated, to allow the input of exposure correcting data. If a full size frame designated for pseudo-zooming photography is photometrically measured for exposure correction surrounding undesignated portions outside the desired subject image will be included in the photometric measurement. This would affect the accuracy of the resulting exposure correction data because the photometry of the subject image as recorded would take into account the portions outside the subject image. Accordingly, photometric measurements of subject images designated for pseudo-zooming are often inaccurate.

A monitor display used for checking the finished image in simulation will show the entirety of the full size frame, either with or without the framing line designating the desired subject image inside it. An operator thus is required to estimate exposure adjustment for the desired subject image, which is only a portion of the full size frame, while observing the full size simulated frame. Such visual estimation tends to be influenced by the color and density in the apparently inseparable surrounding undesignated portions outside the desired subject shown on the monitor display. This makes appropriate reproduction of pseudo-zoomed images difficult and slow.

SUMMARY OF THE INVENTION

In view of the foregoing remarks, an object of the present invention is to provide a film analyzer and method of inspecting developed film, in which automatic detection of areas to be printed can be visually confirmed.

Another object of the present invention is to provide a film analyzer and method of inspecting developed film, in which exposure adjustment for a subject image to be reproduced can be performed with high precision.

In order to achieve the above and other objects and advantages of this invention, developed photographic film, on which a plurality of frames of different image areas are recorded to be printed on photographic paper, is inspected. A size of the printing image area in an inspection-designated frame is detected in a first position. A masking device is adjusted and the inspection-designated frame is moved to a second position, downstream from the first position and proximate the masking device, to form an opening corresponding to the size of the printing image area of the inspection designated frame. Photometry of the printing image area of the inspection-designated frame set in the second position is then performed, with the masking device in place. Exposure information is calculated according to a photometric value obtained from the photometry. An image signal corresponding to the inspection-designated frame set in the second position is generated to display a simulated printing-finished image of the inspection-designated frame based on the exposure information. The masking device is set in an unmasked state after inspection. An image signal corresponding to the inspection-designated frame in the unmasked state is then generated and a simulated image is displayed, in order to check the accuracy of the automatic size inspection of printing images. In accordance with the present invention, automatic detection of areas to be printed can be visually confirmed.

In a preferred embodiment, the photographic film has at least two frames of a full size image, a panoramic size image, and a wide-vision size image. The size detector measures a size of the frames optically. Adjustment of a subject image to be reproduced can thus be performed with a high precision. Also, frames having a plurality of sizes recorded on the developed film can be prevented from erroneous discrimination.

Further, the photographic film can have a pseudo-zooming frame of which a portion is to be printed according to trimming printing. The size detector reads pseudo-zooming information recorded on the photographic film. Adjustment of a subject image to be printed can be performed without being affected by undesired surrounding portions which are outside the subject image.

BRIEF DESCRIPTION OF THE DRAWINGS

The above objects and other advantages of the present invention will become more apparent from the following detailed description when read in connection with the accompanying drawings, in which.

DETAILED DESCRIPTION OF THE PREFERRED EMBODIMENTS

Figure 1:
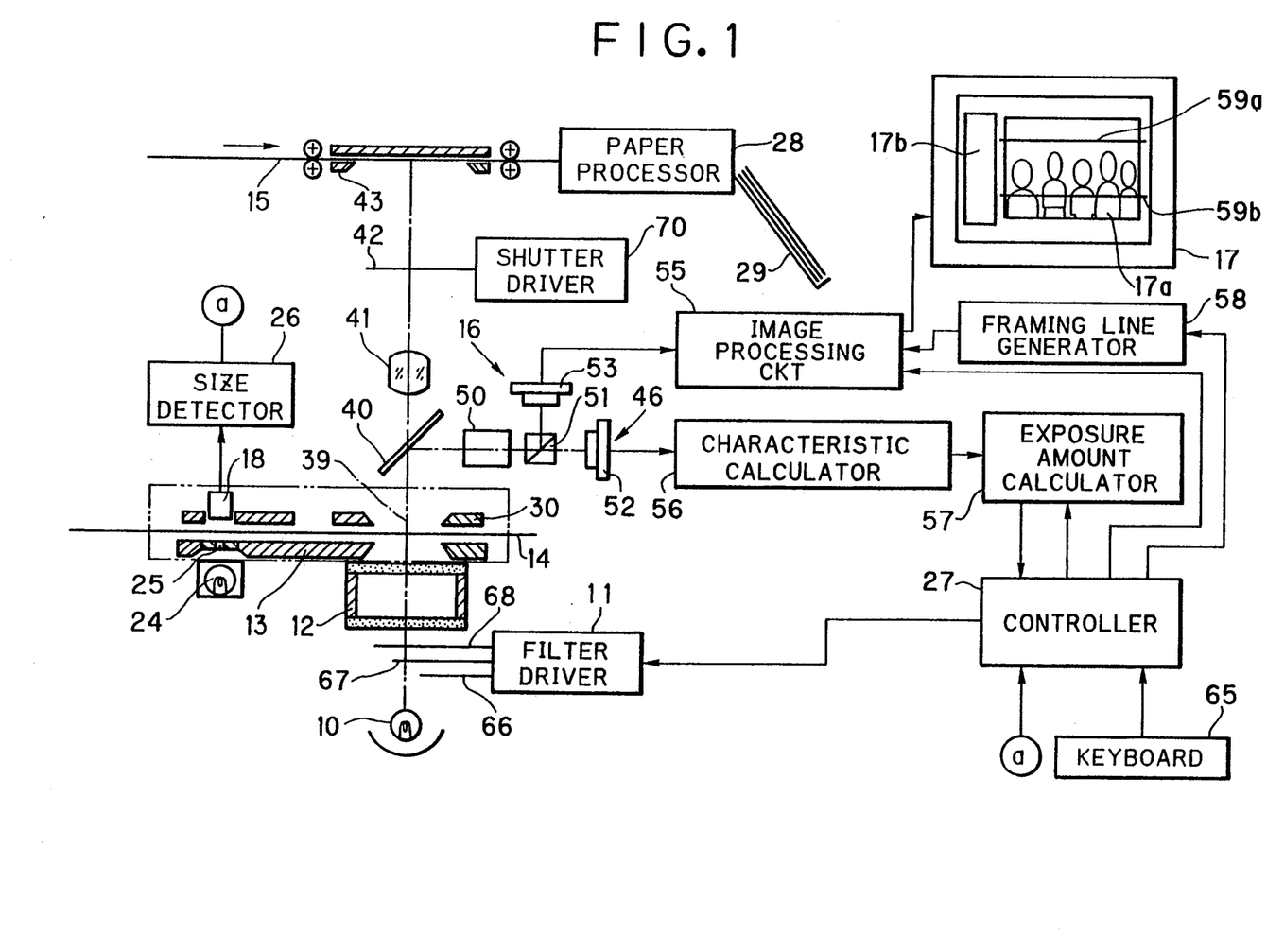
FIG. 1 is a schematic diagram illustrating a photographic printer-processor equipped with a monitor display in accordance with a preferred embodiment of the invention.

FIG. 1 illustrates a photographic printer-processor equipped with a monitor display 17 in accordance with a preferred embodiment of the invention. A light source 10 emanates printing light, which is passed through three color filters 66-68 and a light diffusing box 12, and illuminates a negative film 14 positioned on a film carrier 13. Accordingly, a projected image is formed to expose photographic color paper 15 to print a picture frame of the film 14. Filter driver 11 selectively positions the filters 66-68 into and out of the light path in a known manner. The subject image on the frame is also picked up by a pick-up section 16 to display the image on a color cathode-ray tube (CRT) 17. This is discussed in detail below. The color paper 15 as exposed is sent to a paper processor 28, is developed in the paper processor 28, is cut off frame by frame, and is ejected to a receptacle tray 29.

Figure 2:
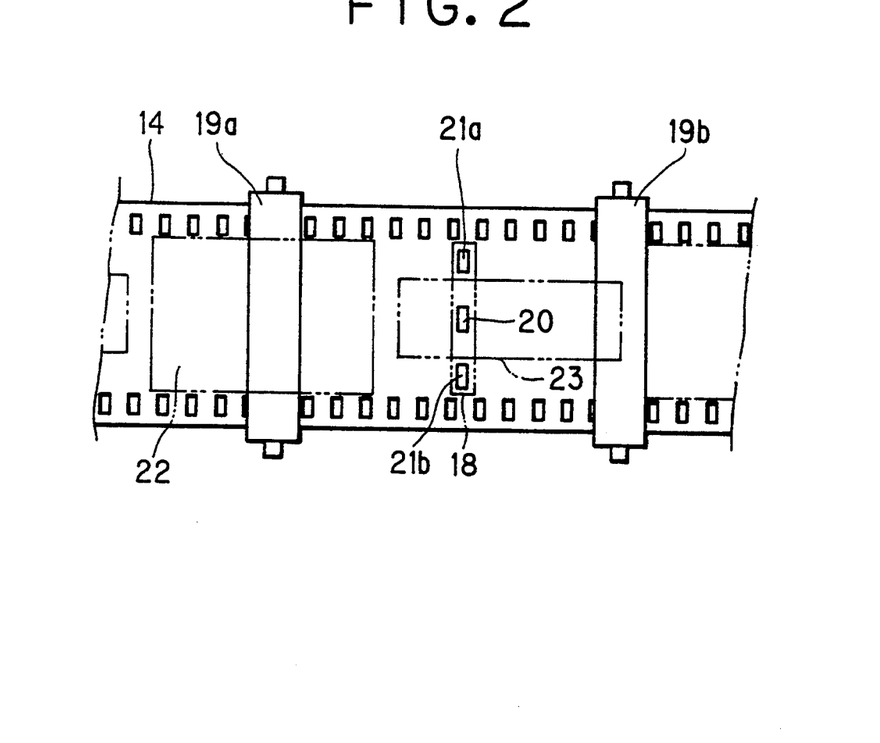
FIG. 2 is an explanatory view illustrating a photo sensor array for detecting sizes of frames on developed film.

The film carrier 13 is provided with a photo sensor array 18 for automatic discrimination of panoramic frames 23 recorded on the film carrier 13. As illustrated in FIG. 2, the photo sensor array 18 is arranged between two rollers 19a and 19b, and constituted of an inner sensor 20 and two outer sensors 21a and 21b. The three photo sensors 20, 21a and 21b are aligned across the length of the film 14. The inner sensor 20 is arranged to correspond to the center of the width of the photographic film 14, and adapted to detection of transmittance density of the negative film 14 at a position located inside a full size frame 22 and a panoramic frame 23. The outer sensors 21a and 21b are arranged near the lateral edges of the negative photographic film 14, and adapted to detection of the density of the negative film 14 at a position located inside a full size frame 22 and outside a panoramic frame 23. A light source 24 and a plate 25, having a slit formed therein are disposed under the negative film 14. A light beam is thereby applied to the negative film 14.

The photo sensors 20, 21a and 21b sense the light through the negative film 14 and photoelectrically convert the light into an electrical output to measure the light through the negative film 14 and to generate signals associated with the density of the negative film 14. The output signals are sent to a size detector circuit 26 (see FIG. 1). If the inner sensor 20 detects a sufficiently high density, and if the outer sensors 21a and 21b detect a density low enough to be in a density range corresponding to the base material of the negative film, namely an unexposed portion of the negative film, then the detected frame is judged as a panoramic frame 23, which has a range narrowed in the direction along the film width. On the other hand, if the inner sensor 20 detects a sufficiently high density, and if the outer sensors 21a and 21b detect a density which is higher than the density range corresponding to the film base, then the detected frame is judged as a full size frame. The size signal, for either the panoramic size or the full size, is sent to a controller 27. The controller 27, according to the size signal, adjusts a carrier masking 30 on the film carrier 13 from a full size aperture to a panoramic aperture. The carrier masking 30 is used for masking the frame to be printed so that points within a portion of the frame remaining inside the carrier masking 30 are measured by three color separation photometry, and that the remaining portion of the frame is picked up for displaying simulation of the subject image to be reproduced.

Figure 3:
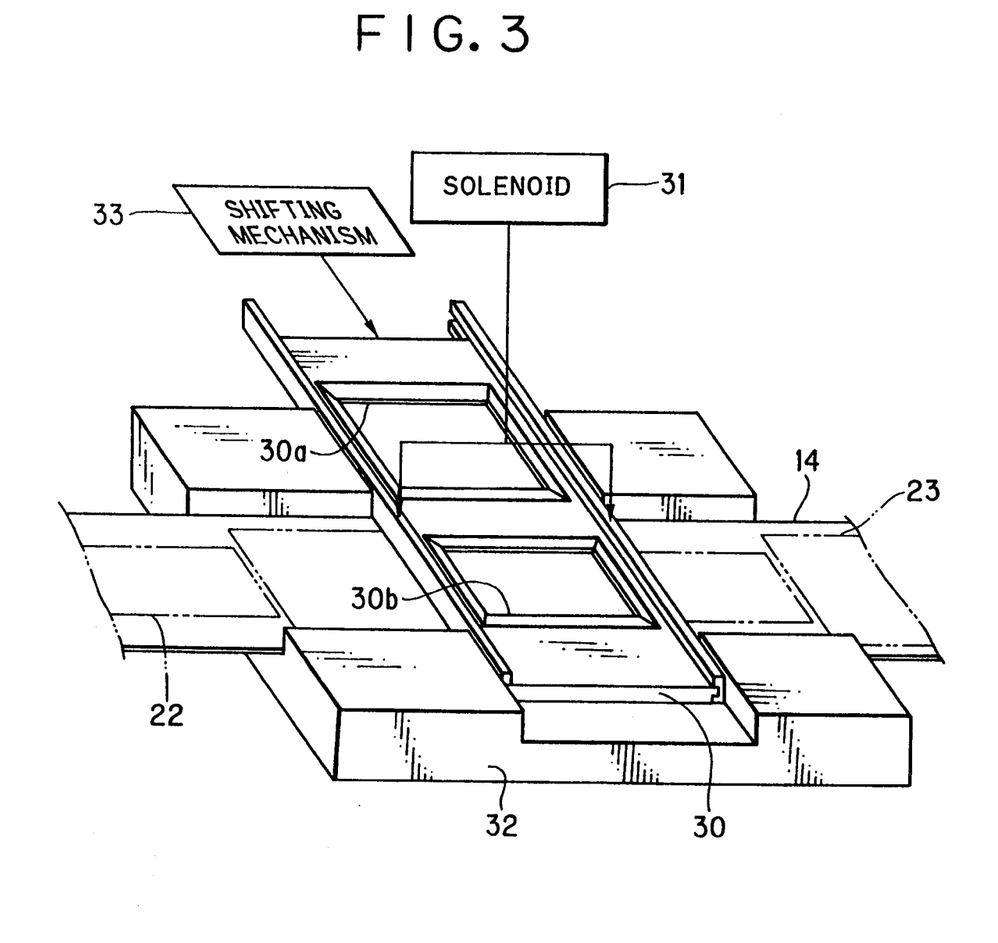
FIG. 3 is a perspective view illustrating a masking mechanism of the preferred embodiment.

The carrier masking 30 is arranged in a printing position of the film carrier 13. As illustrated in FIG. 3, the carrier masking 30, before photometry and before printing, is lowered by a solenoid 31 to position the negative film 14 on a carrier base 32. A full size opening 30a and a panoramic opening 30b are formed in the carrier masking 30. A shifting mechanism 33 drives the carrier masking 30 horizontally to set either of the openings 30a and 30b into the printing station. Note that, in place of the slidable carrier masking with two opening sizes, a pair of L-shaped slidable arms may be arranged and moved relatively to define various sized openings.

Normally, the carrier masking 30 is set to position the full size opening 30a in the printing station. If the panoramic frame 23 is detected by the size detector circuit 26 to be in the printing station, the panoramic opening 30b is positioned in the printing station. Photometry is then performed with the panoramic opening 30b positioned.

As is illustrated in FIG. 1, the negative film 14 and the color paper 15 are arranged to lie in a printing light path 39, along which a half mirror 40, a zoom lens 41 an a shutter 42 are also arranged. A variable paper masking 43 is disposed over the color paper 15 in a known manner. The paper masking 43 is variable in the size of the opening defined thereby in accordance with the designated printing size. The focal length of the zoom lens 41 is adjusted by a motor driving the zoom lens 41, to change the printing magnification according to the designated printing size. The half mirror 40 is adapted to both transmission and reflection of the printing light. The half mirror 40 thus reflects a portion of the printing light aside to fall incident on the pick-up section 16 and a scanner 46. Note that the half mirror 40 may be replaced with a movable mirror of a general type. Such a movable mirror may be either slidable or swingable, and be inserted into, and retracted from, the light path 39 to selectively reflect the light in the desired direction.

To monitor the simulation of the subject image, the light reflected by the half mirror 40 is passed through a second zoom lens 50, and falls incident on a beam splitter 51. The light passed through the beam spitter 51 falls incident on a color image sensor 52 of the scanner 46. The light reflected from the beam splitter 51 falls incident on a color image sensor 53 of the pick-up section 16. The zoom lens 50 is driven by a motor to adjust the focal length thereof. If the printing size is changed for each kind of the negative film, the monitor CRT 17 displays each simulated image 17a formed in one given size based on a signal generated by image sensor 53.

The color image sensors 52 and 53 are for example of a MOS 53 type or a CCD type. The color image sensor 52 performs three color separation photometry of 300 points in a frame to be printed, namely in a matrix of 20×15. The data obtained by photometry is sent to a characteristic calculator 56. The characteristic calculator 56, as is well known in the art, extracts a large-area transmittance density (LATD), and maximum and minimum densities, among other characteristics, to send them to an exposure amount calculator 57. The exposure amount calculator 57 calculates a fundamental exposure amount according to known exposure amount calculating equations. The calculated exposure amount is then output to the controller 27. The controller 27 drives the filter driver 11 according to the exposure amount, and adjusts the quality and the intensity of the printing light appropriately. Thus, the frame to be printed is illuminated with the printing light at the quality and intensity corresponding to the fundamental exposure amount based on the data from photometry.

The video signal generated by the color image sensor 53 is sent into an image processing circuit 55 for processing the video image by converting the negative video signal into a positive video signal and while simulating the characteristics of the color 15 in a known manner. The image processor circuit 55 is also provided with signals representing other information to be displayed on the monitor CRT 17 together with the subject image. The monitor CRT 17 displays the simulated image 17a simulating the printed image of the frame to be printed, and a set of indications 17b representing the position marks, printing size, and the printing magnification, among other information. The image processing circuit 55 is connected to a framing line generator 58, which generates signals representing two horizontal framing lines 59a and 59b to define the upper and lower limits of the panoramic frame 23. The precise procedure of displaying the simulated image 17a, the indications 17b and the horizontal framing lines is described in detail for example in the U.S. Pat. No. 4,927,266.

An operator observes and checks the simulated image 17a on the monitor CRT 17, and visually estimates any required exposure correction. With the exposure correction estimated, the operator operates correcting keys of a keyboard 65 to enter the corresponding exposure correcting data, or instructions, into the controller 27.

The controller 27 then drives the filter driver 11 to move at least one of the red filter 66, green filter 67 and blue filter 68, to adjust the inserting amounts thereof with respect to the light path 39 to change the quality and intensity of the printing light. Such operation of the correcting keys actuates the filter driver 11 and changes the printing light while the image on the frame to be printed is detected by image sensors 52 and 53. Upon the operation of the correcting keys, the color balance and density of the simulated density 17a are changed and observed in the monitor CRT 17. Checking the simulation as to exposure characteristics and position, the operator, if it is acceptable, confirms the simulated image 17a and operates a printing key in the keyboard 65. The operation of the printing key causes the controller 27 to control a shutter driver 70, and prints the printing-designated frame on the color paper 15 in accordance with the exposure correcting data. After printing, the negative film 14 is fed by a length of one frame, to position another frame on the printing station. Note that the pick-up section 16 is constructed to stop picking up the image in response to actuation of the printing key.

The operation of the present embodiment will now be further described with reference to FIGS. 4A and 4B. The negative film 14, on which frames both of the full size and of the panoramic size are recorded, is set on the film carrier 13. The controller 27 feeds the negative film 14 to position the first frame on the printing station. During this feeding of the film 14, the film density is detected by the photo sensor array 18. The size detector circuit 26 thus automatically detects the size of the frame in accordance with the changes or differences in density, in the manner as described above.

If the frame size is detected as panoramic, the carrier masking 30 is slid by the shifting mechanism 33 as illustrated in FIG. 3, to set the panoramic opening 30b in the printing station. Afterwards, the scanner 46 is actuated to perform three color separation photometry at each point in the frame to be printed. The pick-up section 16 is actuated to start picking up the panoramic frame 23 on the color image sensor 53. The panoramic frame 23 is then processed in the image processing circuit 55, and is simulated on the monitor CRT 17 as the image 17a.

Should photometry and pick-up be performed for the panoramic frame 23 in the conventional manner, the panoramic frame 23 would be left unmasked in a full size opening. The upper and lower unexposed portions, even though having no part of a desired subject image, would be included in the area measured in photometry and picked up. This would affect the result of photometry and pick-up of the panoramic frame, because the photometry and pick-up of the panoramic frame would have taken into account the portions outside of the desired subject image. Accordingly, the photometry would be incorrect, with low fidelity in picking up the subject image. However, in the present invention, the panoramic frame 23 is masked in the panoramic opening 30b. The upper and lower unexposed portions, having no part of a desired subject image, are excluded from the area measured in photometry and picked up. The photometry and pick-up of the panoramic frame 23 are not influenced by the portions outside the subject image. Accordingly, the photometry is correct, and a high fidelity is achieved in the picked up subject image.

The simulated image 17a is then visually checked by the operator. If necessary, exposure correcting data is inputted. In response to this, the positions of the color filters 66–68 are changed to adjust the quality and intensity of the printing light, to display the simulated image 17a on the monitor CRT 17 after exposure correction. At this time, the panoramic opening 30b is retracted from the printing position and the full size opening 30a is set into the printing position. The simulated image 17a is thus displayed as a full size frame, namely together with the upper and lower unexposed portions next to the subject image. The horizontal framing lines 59a and 59b are generated to indicate the panoramic range within the full size range.

Because the simulated image 17a is displayed as a full size image, should a full size frame of under-exposure be automatically judged as a panoramic frame, the erroneously judged full size frame can be visually judged as full size in a correct manner. To do this, with the under-exposure full size frame masked with the panoramic opening 30b, the exposure amount is corrected in view of the central panoramic range of the subject image. With the panoramic opening 30b retracted, the full size frame is simulated, so that the upper and lower horizontal portions appear on the monitor CRT 17. Although it is ordinarily difficult to visually discriminate such upper and lower horizontal portions of under-exposure as part of a subject image, exposure correction makes it possible to reliably judge the under-exposure full size frame by use of the monitor CRT 17. Therefore, a full size frame will not be misprinted as panoramic size.

Figure 4A:
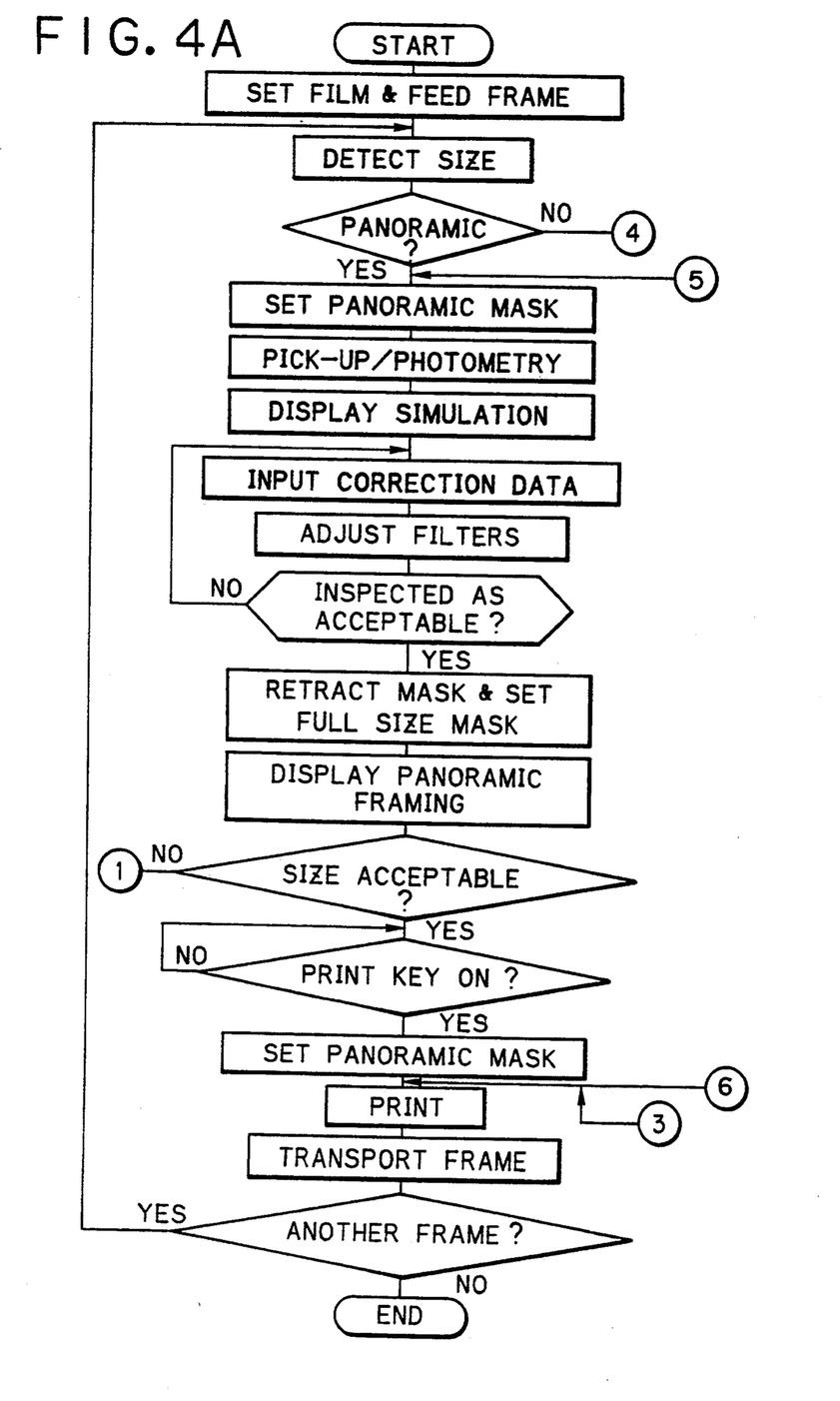
FIGS. 4A and 4B are flow charts illustrating the inspection process of panoramic frames and full size frames.
Figure 4B:
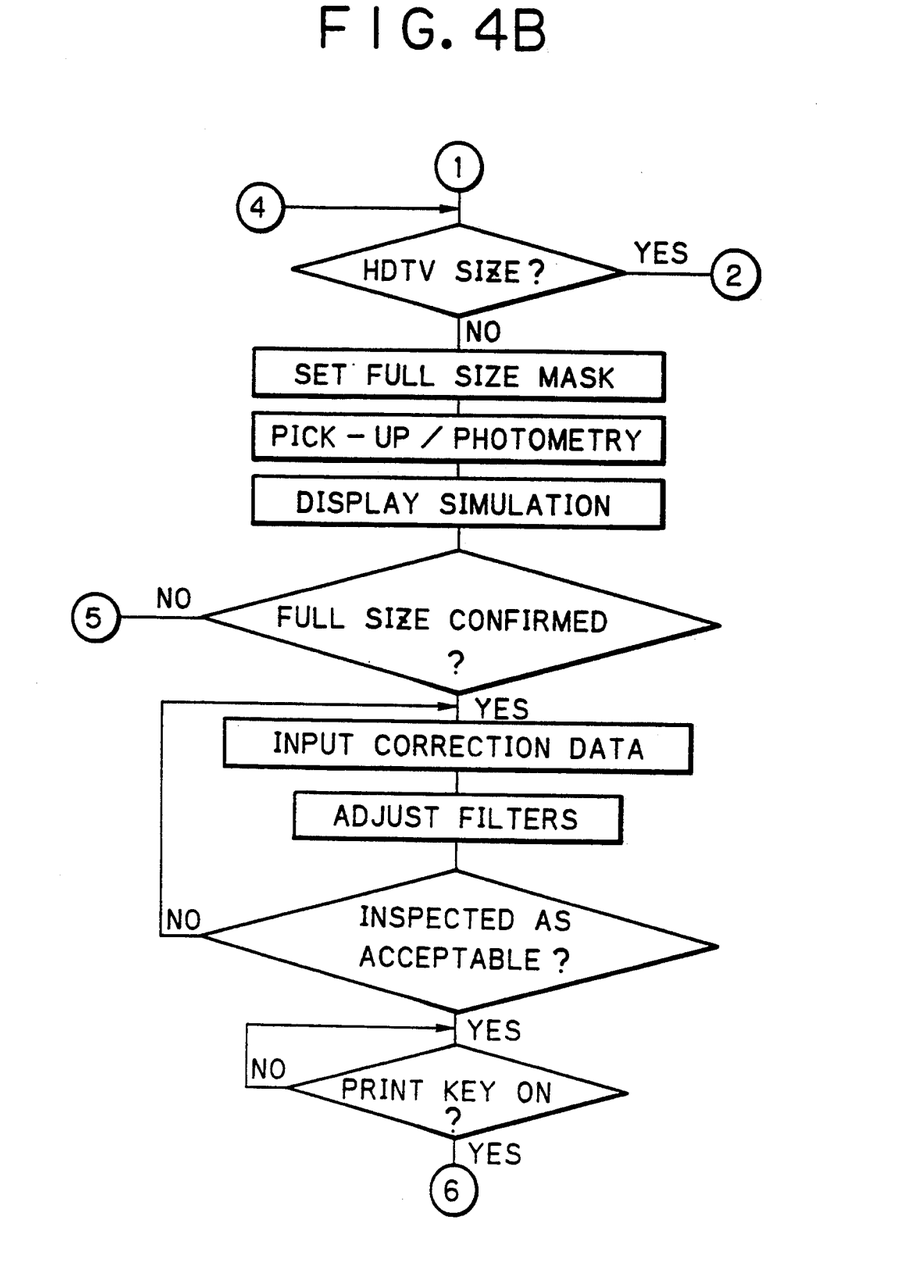

To print the panoramic frame 23, the carrier masking 30 is again shifted to position the panoramic opening 30b on the panoramic frame 23, as illustrated in the flow chart of FIG. 4A. While the frame 23 is printed, the color paper 15 is masked by a corresponding panoramic opening at which the paper masking 43 is set. Note that, because the paper 15 is masked panoramically, it is possible to keep the panoramic opening 30b retracted from the panoramic frame 23 during a printing operation, to leave the frame 23 unmasked. This increases efficiency in printing frames to produce photographs.

If the frame is automatically judged as full size, the full size opening 30a is positioned in the printing station. The full size frame masked as such is picked up and measured photometrically. The simulated positive image of the subject image as picked up is displayed on the monitor CRT 17. The operator observes the simulated image to check the frame size. If the frame size is erroneously as full size automatically, the operator enters a command through the keyboard 65 to position the panoramic opening 30b in the printing station. If the full size frame is confirmed on the monitor CRT 17 on the other hand, then correction of the simulated image is estimated, and the correcting keys are operated to input the exposure correcting data. With the correcting data entered, positions of setting the color filters are adjusted. The simulated image 17a, after exposure correction, is displayed on the monitor CRT 17. If the corrected simulation is acceptable, then the printing key is operated to print the printing-designated frame on the color paper. The negative film 14 is then fed to position the following printing-designated frame in the printing station to produce another photograph.

In above embodiment, the first or normal size is the full size, while the second or specialized size is the panoramic size. Alteratively, the first size may be a half size in which the horizontal range is half as long as the full size. The second size may be another long size in which the vertical range is narrowed, e.g., a wide-vision size having the aspect ratio of 1.78 the same as the format of high-definition television system, or a cinema size having the aspect ratio of 2.30. The second size may also be a size in which the horizontal range is shortened, e.g., a square size having the aspect ratio of 1.0. Horizontal framing lines can be indicated for the wide-vision sizes, and the shortened size can be indicated by vertical framing lines.

Figure 5:
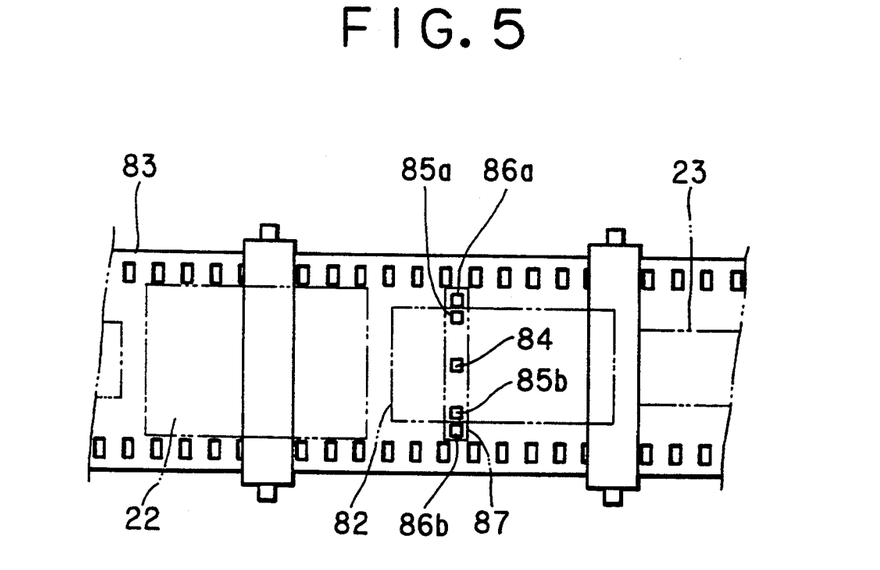
FIG. 5 is an explanatory view illustrating a photo sensor array of the preferred embodiment for detecting full size, panoramic size and wide-vision size of frames on developed film.

FIG. 5 illustrates another preferred embodiment for a negative film 83, on which frames of three sizes are recorded, namely the frames 22 of the full size, the frames 23 of the panoramic size, and frames 82 of the wide-vision size. Elements similar to those in the former embodiments are designated with identical reference numerals. To produce photographs from the negative film 83, a photo sensor array 87 is used, in which an inner sensor 84, two intermediate sensors 85a and 85b and outer sensors 86a and 86b are arranged. The five photo sensors 84, 85a, 85b, 86a and 86b are aligned across the length of the film 83. The inner sensor 84 is arranged to correspond to the center of the width of the photographic film 83, and adapted to detection of transmittance density of the negative film 83 in a position located inside the full size frame 22, the wide-vision frame 82 and the panoramic frame 23. The intermediate sensors 85a and 85b are adapted to detection of the density of the negative film 83 in a position located inside the full size frame 22, inside the wide-vision frame 82, and outside the panoramic frame 23. The outer sensors 86a and 86b are arranged near the lateral edges of the negative photographic film 83, and adapted to detection of the density of the negative film 83 in a position located inside the full size frame 22, outside the wide-vision frame 82, and outside the panoramic frame 23.

Figure 6:
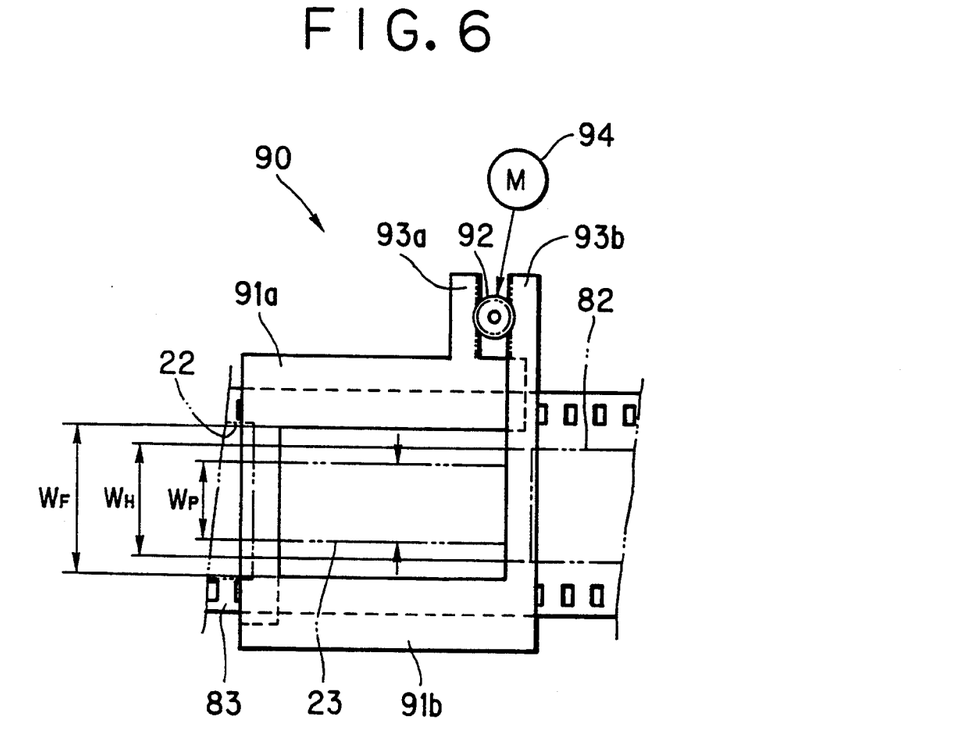
FIG. 6 is a schematic view illustrating a variable masking device of the preferred embodiment.

To mask the frames 22, 23 and 82 respectively, variable carrier masking 90 illustrated in FIG. 6 is used. The masking 90 is constituted of a pair of L-shaped slidable arms 91 a and 91b and a pinion gear 92 for linking together the arms 91 a and 91b. The arms 91a and 91b are provided with the rack portion 93a and 93b which extend in parallel across the length of the film 83. The pinion 92 is meshed with both of the racks 93a and 93b. When a motor 94 rotates the pinion 92, the arms 91 a and 91b are slid in the direction along the film width, in the opposite directions to move toward or away from each other. The motor 94 is stopped when the arms 91a and 91b are at respective intervals defining a full size width WF, a wide-vision width WH, and a panoramic width WP, to define the desired framing openings for the full size, wide-vision size and panoramic size respectively.

Figure 7:
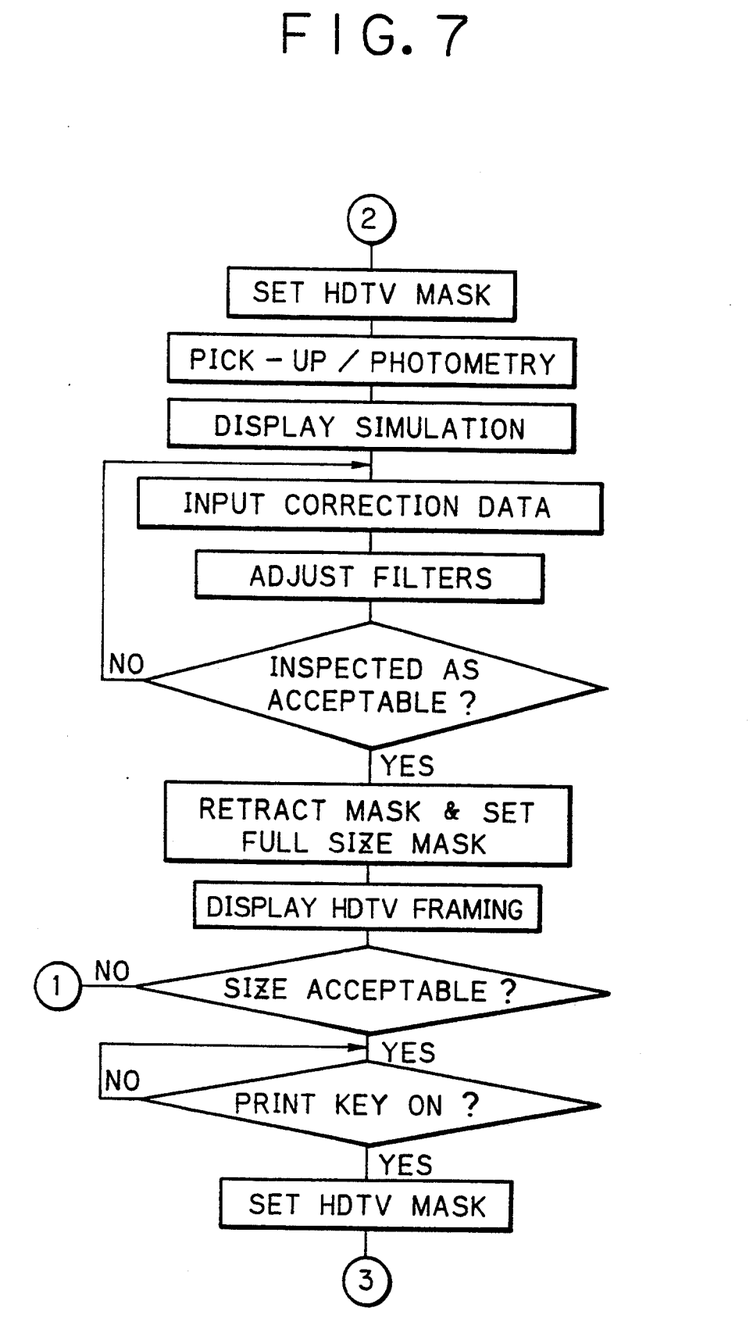
FIG. 7 is a flow chart illustrating the inspection process of wide-vision frames.

If the intermediate sensors 85a and 85b detect a sufficiently high density, and if the outer sensors 86a and 86b detect a density low enough to be in a density range corresponding to the base material of the negative film, then the detected frame is judged as wide-vision frame 82. The slidable arms 90 are then positioned at the interval of the wide-vision width WH, in order to pick up the frame and measure it photometrically. By following the process as illustrated in FIG. 7, the frame is checked and printed.

Figure 8:
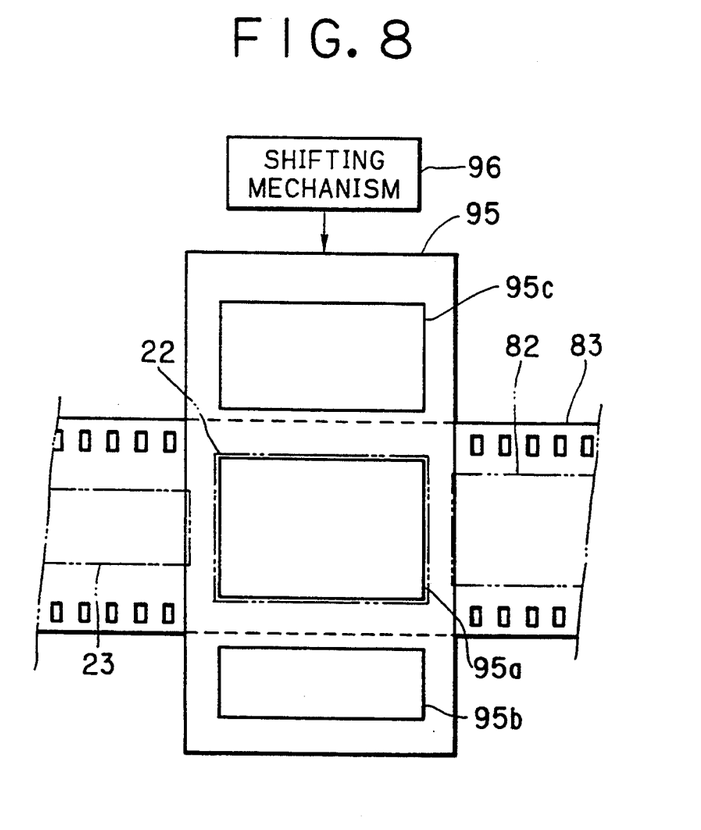
FIG. 8 is a schematic view illustrating an alternate masking mechanism of the preferred embodiment which is changeable among the panoramic opening, a wide-vision opening, and a full size opening.

Instead of use of the variable masking 90, a carrier masking 95 may be used for masking, as illustrated in FIG. 8. A full size opening 95a, a panoramic opening 95b and a wide-vision opening 95c are formed in the carrier masking 95. A shifting mechanism 96 drives the carrier making 95 to side it to a desired one of the openings 95a to 95c into the printing station, in correspondence with one of the frames 22, 23 and 82.

Figure 9:
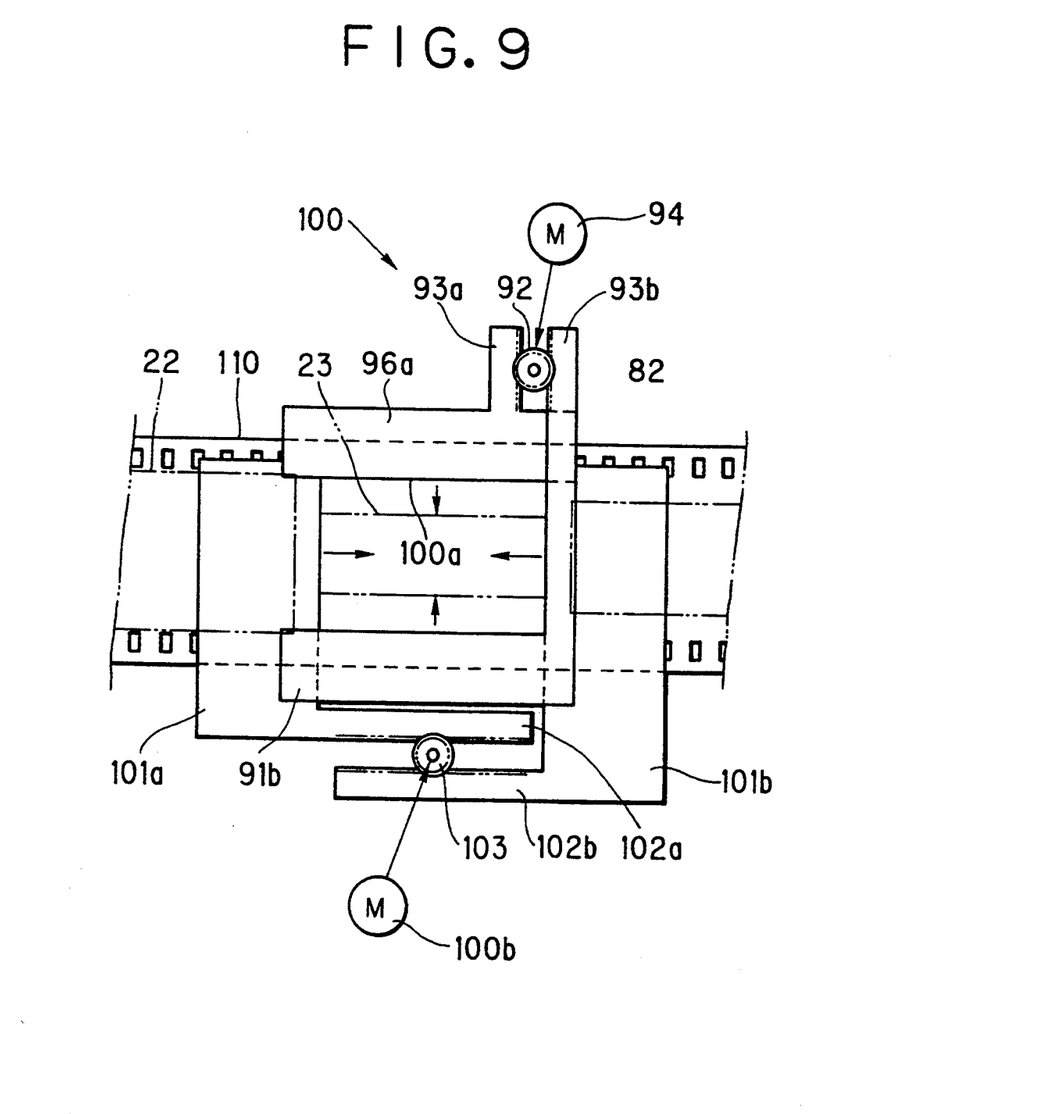
FIG. 9 is a schematic view illustrating a variable masking device for inspection of frames designated in pseudo-zooming photography.

Instead of the above negative film 14 or 83, a negative film on which pseudo-zooming information is recorded in association with the frames to indicate the intention of printing photographs while enlarging a portion of the frames. Although the masking in the above embodiment is varied according to frame sizes for photometry and pick-up, a similar masking in the embodiment below is varied according to a limited range as designated in pseudo-zooming photography for the trimming printing. FIG. 9 illustrates such a variable masking 100. Elements similar to those in the former embodiments are designated with identical reference numerals. To mask the frame in the direction along the film width, slidable arms 96a and 91b are operated in a manner similar to the former embodiment. To mask the frame in the direction along the film length, the masking 100 has a pair of L-shaped slidable arms 101a and 101b. The arms 101a and 101b are provided with rack portions 102a and 102b which are in parallel and extend across the length of a negative film 110. The pinion 103 is meshed with both of the racks 102a and 102b. When a motor 100b rotates a pinion 103, the arms 101a and 101b are slid in the direction along the film width, in opposite directions to move toward and away from each other.

The pseudo-zooming information is recorded at the time of taking a photograph on a magnetic recording area, or the like, formed on the photographic film or an IC card contained in a camera taking the photograph with the film, and constitute photograph-taking information for the purpose of printing instructions for the photograph from the negative film. Note that such an information-recording camera is referred to, for example, in a commonly-assigned co-pending application U.S. Ser. No. 07/753,770. For pseudo-zooming photography, a camera is operated to expose a full size frame on photographic film. However, a rectangular portion inside the frame is designated while a photographer observes a masked photographic subject, e.g., by display of a rectangular framing within a viewfinder, otherwise by construction of a zoom finder with which the photographer targets the subject while the viewfinder zooms. The camera checks the zooming magnification in correspondence with the targeted range, and records printing magnification data, derived from the zooming magnification, on the recording medium, such as magnetic recording area on the photographic film or an IC card in the camera. To print a pseudo-zoomed photograph, the designated portion in the frame to be printed is enlarged according to the printing magnification data read out of the recording medium. The photograph obtained has an image reproduced as if a photograph were taken in telephotography by adjusting a zoom lens.

Figure 10:
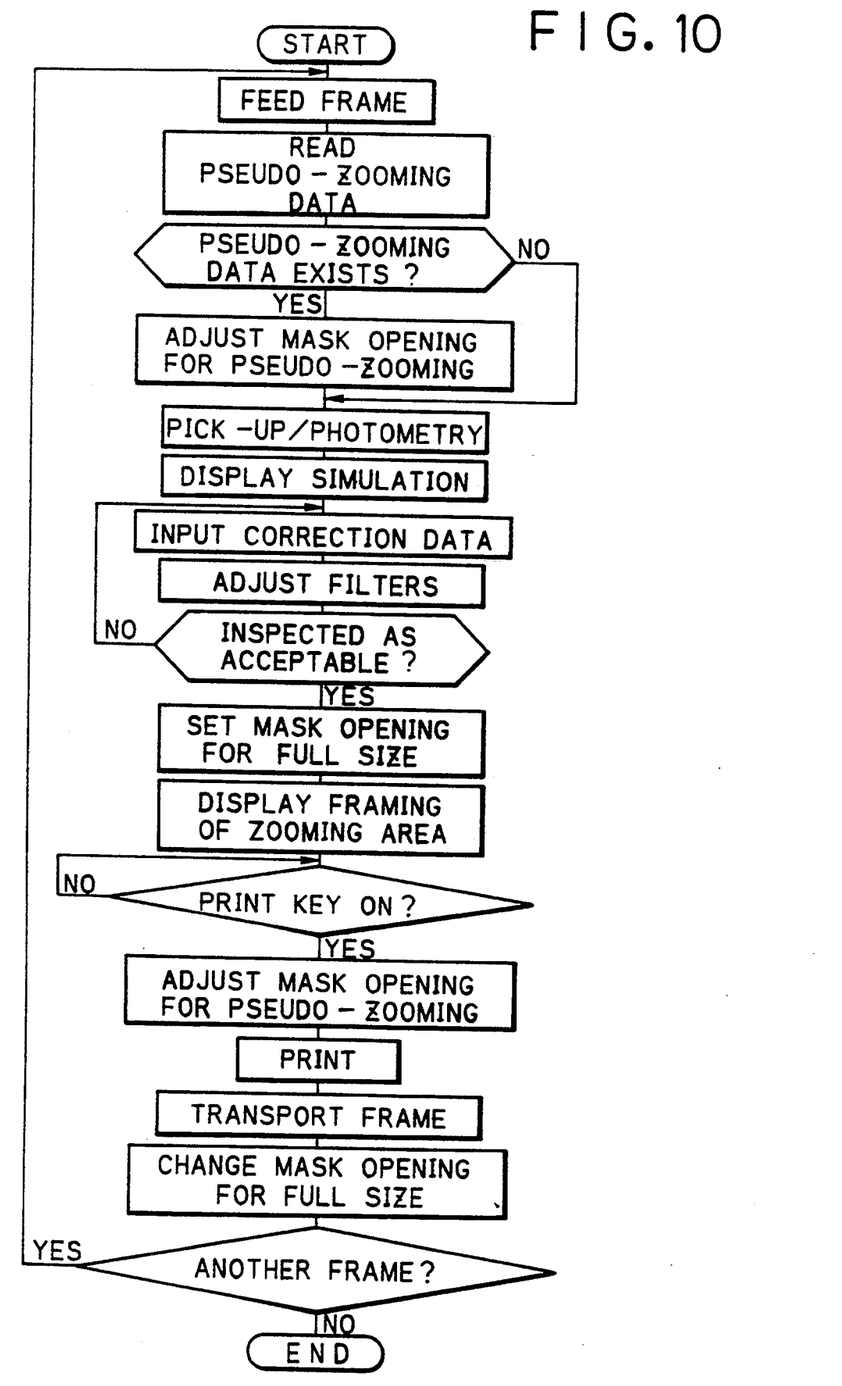
FIG. 10 is a flow chart illustrating the process of inspection of the frames designated for pseudo-zooming.
Figure 11:
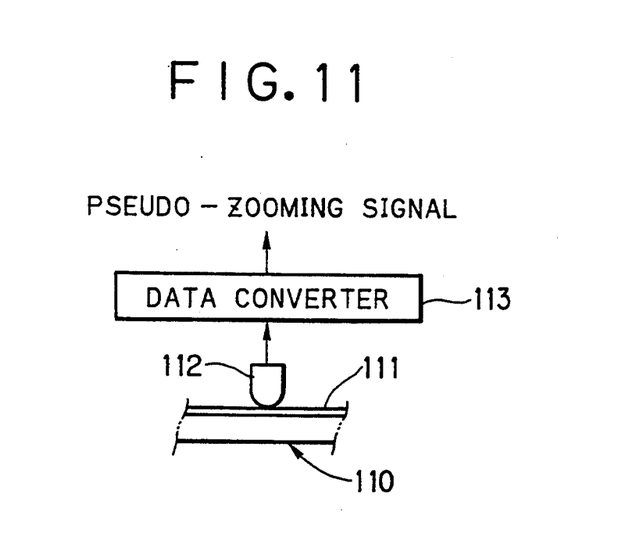
FIG. 11 is a schematic view illustrating a structure for reading pseudo-zooming information out of the film according to the preferred embodiment.

As illustrated in FIG. 10, the frame for the trimming printing is also measured in photography and picked up. The pseudo-zooming information is read out of a magnetic recording area 111 on the negative film 110 or the IC card. The photographic printer changes a variable opening 105 defined by the masking 100, to mask the frame around the pseudo-zooming portion having a subject image. As illustrated in FIG. 11, a reader incorporated in the printer for reading the pseudo-zooming information is constituted of a magnetic head 112 in contact with the magnetic recording area 111, and a data converter 113 for converting the output signal from the magnetic head 112 into a pseudo-zooming signal. Detailed construction of this information reader is suggested in the commonly assigned co-pending application U.S. Ser. No. 07/753,770.

The subject image designated for pseudo-zooming is measured in photometry and picked up for simulation, while the surrounding portions outside the subject image are masked by the variable masking 100. The surrounding undesignated portions, without being targeted as a subject image, are excluded from the area measured in photometry. The photometry and pick-up of the pseudo-zooming portion having the subject image do not take into account the portions outside the subject image. Accordingly, the photometry is correct, and high fidelity is achieved in picking up the subject image. The simulated image is observed, and visually checked. If necessary, exposure correcting data is inputted. In response to this, the positions of the color filters 66 to 68 are changed to adjust the printing light, to display the simulated image on the monitor CRT 17 after exposure correction.

After the inspection, the variable masking 100 is shifted to have the full size opening 95a. The monitor CRT 17 displays the frame designating a trimming-printing area, which is so observed that the trimming-printing area within the frame can be checked. If the trimming-printing area is inappropriate or different from what is intended, it is possible to adjust, for example lessen, the magnification of the zoom lens 50 to prevent the subject image from being partially cut out of the photograph as printed.

Note that the pseudo-zooming portion having the subject image can be enlarged for display on the monitor CRT 17, so that the exposure correction can be easily determined. All the embodiments above are described in relation to use in a printer processor. Alternatively, the present invention is applicable also to a film analyzer of a separate type.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, as defined by the appended claims, they should be construed as included therein.

What is claimed is:

1. A film analyzer for inspecting developed photographic film on which a first size frame and a second size frame, which is smaller than said first size frame are recorded, said film analyzer comprising:
    photometric means, provided with a measuring area range covering said first size frame, for performing photometry of an inspection-designated frame set in a first position;
    exposure calculating means for calculating exposure information according to a photometric value from said photometric means;
    pick-up means, provided with a pick-up area range covering said first size frame, for detecting an image formed in said inspection-designated frame set in said first position and outputting first image data which represents said image;
    image processor mean for processing said first image data according to said exposure information to generate second image data, which represents a simulated printing-finished image of said image formed in said inspection-designated frame;
    display means for displaying said printing-finished image according to said second image data;
    size detecting means for detecting a size of said inspection-designated frame;
    masking means for masking said inspection-designated frame so as to define a perimeter of said inspection-designated frame, during an inspection mode, when said size detecting means detects that said inspection-designated frame is of said second size frame, said photometry being performed by said photometric means while said inspection-designated frame is masked by said masking mean, said pick-up means, detecting said image formed in said inspection-designated frame as masked during an inspection mode, and, picking up said image formed in said inspection-designated frame in an unmasked state in a checking mode, in order to check an automatic size inspection performed by said size detecting means.

2. A film analyzer as defined in claim 1, wherein said size detecting means is arranged in a second position upstream from said first position, and said masking means performs a masking operation in a course of movement of said inspection-designated frame from said second position to said first position.

3. A film analyzer as defined in claim 2, wherein said masking means forms a first opening at a size covering said first size frame when set for said unmasked state.

4. A film analyzer as defined in claim 3, wherein said photometric means performs said photometry at one time upon a start of said inspection mode.

5. A film analyzer as defined in claim 4, which further comprises inputting means for inputting manual correcting information for correcting density and/or color balance of said printing-finished image, and wherein, when said manual correcting information is inputted, said exposure calculating means calculates new exposure information in accordance with said manual correcting information.

6. A film analyzer as defined in claim 5, wherein said masking means comprises a slidable masking plate provided having first and second openings formed therein, said second opening corresponding to said second size frame, and drive means for sliding said masking plate.

7. A film analyzer as defined in claim 5, wherein said masking means is variable and comprises a pair of slidable masking arms arranged in opposition to each other, and linked together to move symmetrically with respect to a center line of a width of said film, thereby defining said first and second openings.

8. A film analyzer as defined in claim 5, wherein said first position is a position of printing in a photographic printer, which prints said inspection-designated frame on color paper when a printing is entered after said inspection mode.

9. A film analyzer as defined in claim 8, wherein said size detecting means includes a first photo sensor arranged at a position which corresponds to a substantially central portion of said film and a second photo sensor arranged at a position which corresponds to at least one side of said photographic film and is included in an area of said first size frame is passed.

10. A film analyzer as defined in claim 9, wherein said first size frame is a full size frame, and said second size frame is a panoramic size frame wherein upper and lower portions of said full size frame are cut off.

11. A film analyzer as defined in claim 10, wherein said display means displays a framing line for defining said second size frame while an entirety of said inspection-designate frame, in said unmasked state, is displayed on said display means, in order to confirm detection of said second size frame at said size detecting means.

12. A film analyzer as defined in claim 11, wherein said film is further provided with a wide-vision size frame which is smaller than said first size frame and larger than said second size frame, said size detecting means further includes a third photo sensor arranged at a position which corresponds to at least one size of said photographic film and which is included in an area of said first and third size frames only, said masking means masks said wide-vision size frame to define said wide-vision frame, and forms said first opening after said inspection mode.

13. A film analyzer for inspecting developed photographic film which comprises a pseudo-zooming frame of which a portion is to be printed with a trimming printing operation, pseudo-zooming information being recorded in association with said pseudo-zooming frame for said trimming printing operation, said film analyzer comprising:

photometric means, provided with a measuring range area covering the entirety of said pseudo-zooming frame, for performing photometry of an inspection-designated frame set in a first position;

exposure calculating means for calculating exposure information based on a photometric value from said photometric means;

pick-up means, provided with a pick-up area covering the entirety of said pseudo-zooming frame, for detecting said inspection-designated frame set in said first position to output first image data which represents an entire image recorded in said inspection-designated frame;

image processor means for processing said first image data according to said exposure information to generate second image data, in order to simulate a printing-finished image of said image recorded in said inspection-designated frame;

display means for displaying said printing-finished image according to said second image data;

reader means for reading said pseudo-zooming information; and masking means for masking said inspection-designated frame so as to surround said portion of said pseudo-zooming frame when said reader means detects that said inspection-designated frame is said pseudo-zooming frame, said photometry being performed by said photometric means while said inspection-designated frame is masked by said masking means, said pick-up means, in a course of an inspection mode, detecting said inspection-designated frame as masked, and, after said inspection mode, detecting said inspection-designated frame while said masking means is displaced to an unmasked state, in order to check accuracy of an automatic size inspection mode of said reader means.

14. A film analyzer as defied in claim 13, wherein said display means displays a framing line for defining said portion of said pseudo-zooming frame while said inspection-designated frame assuming is displayed on said display in an unmasked means state, in order to confirm detection of said portion at said reader means.

15. A film analyzer as defined in claim 14, wherein said reader means is arranged in a second position upstream from said first position, and said masking means performs a masking operation in a course of movement of said inspection-designated frame from said second position to said first position.

16. A film analyzer as defined in claim 15, wherein said masking means has a first opening defined therein, which is a size corresponding to said inspection-designated frame, when said masking means is in said unmasked state.

17. A film analyzer as defined in claim 16, wherein said photometric means performs said photometry at one time upon a start of said inspection mode.

18. A film analyzer as defined in claim 17, which further comprises inputting means for inputting manual correcting information for correcting at least one of density and color balance of said printing-finished image, and wherein, when said manual correcting information is inputted, said exposure calculating means calculates new exposure information based on said manual correcting information.

19. A film analyzer as defined in claim 18, wherein said masking means is variable in size for said unmasked state, and is constituted of:

a first pair of slidable masking arms arranged in opposition to each other and linked together so as to move symmetrically with respect to a center line of width of said film, thereby defining said designated opening with respect to said film width; and a second pair of slidable masking arms arranged in opposition to each other and linked together so as to move symmetrically with respect to a center line of a length of said frame, thereby defining said designated opening with respect to said frame length.

20. A film analyzer as defined in claim 19, wherein said reader means includes a magnetic head disposed in contact with a magnetic recording portion formed on said film.

21. A film analyzer as defined in claim 20, wherein said first position is a position of printing in a photographic printer, which prints said inspection-designated frame on color paper when a printing mode is assumed after said inspection mode.

22. A method for inspecting developed photographic film on which a plurality of frames are recorded which have different printing image areas to be printed on photographic paper, said film inspecting method comprising:

detecting a size of said printing image area in an inspection-designated frame in a first position;

moving said inspection-designated frame to a second position, which is downstream from said first position, and masking said inspection-designated frame to said size of said printing image area of said inspection designated frame;

performing photometry of said printing image area of said inspection-designated frame set in said second position while said inspection designated frame ins masked;

calculating exposure information based on a photometric value from said photometry;

generating a first image signal representing said inspection-designated frame set in said second position so as to display a simulated printing-finished image of said inspection-designated frame based on said exposure information;

placing said inspection-designated frame in an unmasked state after inspection; and generating a second image signal representative of said inspection-designated frame in an unmasked state and displaying said inspection-designated frame in said unmasked state based on said second image signal, in order to check accuracy of an automatic size inspection of printing images.

23. A film inspecting method as defined in claim 22, wherein said masking step is accomplished with masking means having a first opening formed therein at a size corresponding to an entire printing image area of said inspection-designated frame when in said unmasked state.

24. A film inspecting method as defined in claim 23, wherein said photometry is performed at one time upon a start of said inspection.

25. A film inspecting method as defined in claim 24, wherein, when manual correcting information, for correcting at least one of density and color balance of said printing-finished image, is inputted, new exposure information is calculated based on said manual correcting information.

26. A film inspecting method as defined in claim 25, wherein said second position is a position of printing in a photographic printer, which prints said inspection-designated frame on color paper when a printing instruction is received after said inspection.

27. A film inspecting method as defined in claim 26, wherein display means displays a framing line corresponding to a printing image area which is smaller than an entirety of said inspection-designated frame while said inspection-designated frame in said unmasked state, is displayed on said display means, in order to confirm detection of said printing image size by said size detecting means.

28. A film inspecting method as defined in claim 27, wherein said photographic film comprises at least two frames of a full size printing image, a panoramic size printing image, and a wide-vision printing size printing image, and said size detector measure a size of said frames optically.

29. A film inspecting method as defined in claim 27, wherein said photographic film comprises a pseudo-zooming frame a pseudo-zooming frame of which a portion is printed according to trimming printing, and said size detector reads pseudo-zooming information recorded on said photographic film.

* * * * *